(12) United States Patent
McDonnell

(10) Patent No.: US 9,152,678 B1
(45) Date of Patent: *Oct. 6, 2015

(54) TIME BASED RANKING

(71) Applicant: Google Inc., Mountain View, CA (US)

(72) Inventor: Philip A. McDonnell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,911

(22) Filed: Dec. 8, 2014

Related U.S. Application Data

(63) Continuation of application No. 11/870,893, filed on Oct. 11, 2007, now Pat. No. 8,909,655.

(51) Int. Cl.
*G06F 17/30* (2006.01)

(52) U.S. Cl.
CPC ...... *G06F 17/3053* (2013.01); *G06F 17/30241* (2013.01); *G06F 17/30551* (2013.01); *G06F 17/30864* (2013.01)

(58) Field of Classification Search
CPC .................................................. G06F 17/30864
USPC .................................................. 707/748, 751
See application file for complete search history.

(56) References Cited

U.S. PATENT DOCUMENTS

| 5,265,065 | A | 11/1993 | Turtle |
|---|---|---|---|
| 5,488,725 | A | 1/1996 | Turtle |
| 5,696,962 | A | 12/1997 | Kupiec |
| 5,920,854 | A | 7/1999 | Kirsch et al. |
| 5,963,940 | A | 10/1999 | Liddy et al. |
| 6,006,222 | A | 12/1999 | Culliss |
| 6,014,665 | A | 1/2000 | Culliss |
| 6,026,388 | A | 2/2000 | Liddy et al. |
| 6,067,565 | A | 5/2000 | Horvitz |
| 6,076,051 | A | 6/2000 | Messerly et al. |
| 6,078,916 | A | 6/2000 | Culliss |
| 6,078,917 | A | 6/2000 | Paulsen et al. |
| 6,088,692 | A | 7/2000 | Driscoll |
| 6,134,532 | A | 10/2000 | Lazarus et al. |
| 6,182,066 | B1 | 1/2001 | Marques et al. |
| 6,182,068 | B1 | 1/2001 | Culliss |
| 6,185,559 | B1 | 2/2001 | Brin et al. |

(Continued)

FOREIGN PATENT DOCUMENTS

| WO | 00/77689 | 12/2000 |
|---|---|---|
| WO | 01/16807 | 3/2001 |

(Continued)

OTHER PUBLICATIONS

Soumen Chakrabarti, et al. "Enhanced Topic Distillation using Text, Markup tags, and Hyperlinks" ACM, Sep. 9-12, 2001, pp. 208-216.

(Continued)

*Primary Examiner* — Mahesh Dwivedi
(74) *Attorney, Agent, or Firm* — Fish & Richardson P.C.

(57) ABSTRACT

Apparatus, systems and methods for content ranking are disclosed. Historical click-through rates of first and second content items for a query are determined from an analysis of click logs and query logs. Temporal changes in the historical click-through rate of the first and second content items are identified. The rankings of the first and second content items are adjusted based on the temporal change.

30 Claims, 9 Drawing Sheets

(56) References Cited

U.S. PATENT DOCUMENTS

| | | |
|---|---|---|
| 6,249,252 B1 | 6/2001 | Dupray |
| 6,285,999 B1 | 9/2001 | Page |
| 6,321,228 B1 | 11/2001 | Crandall et al. |
| 6,327,590 B1 | 12/2001 | Chidlovskii et al. |
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,769,740 B2 | 8/2010 | Martinez et al. |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,860,886 B2 | 12/2010 | Loftesness |
| 7,877,404 B2 | 1/2011 | Achan et al. |
| 7,895,177 B2 | 2/2011 | Wu |
| 7,925,498 B1 | 4/2011 | Baker et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,086,599 B1 | 12/2011 | Heymans |
| 8,086,690 B1 | 12/2011 | Heymans |
| 8,090,717 B1 | 1/2012 | Bharat et al. |
| 8,126,839 B2 | 2/2012 | Chen et al. |
| 8,156,111 B2 | 4/2012 | Jones et al. |
| 8,171,041 B2 | 5/2012 | Bennett |
| 8,224,827 B2 | 7/2012 | Dean et al. |
| 8,396,865 B1 | 3/2013 | Ie et al. |
| 8,412,699 B1 | 4/2013 | Mukherjee et al. |
| 8,447,760 B1 | 5/2013 | Tong et al. |
| 8,458,165 B2 | 6/2013 | Liao et al. |
| 8,498,974 B1 | 7/2013 | Kim et al. |
| 8,521,725 B1 | 8/2013 | Pearson et al. |
| 8,583,636 B1 | 11/2013 | Franz et al. |
| 8,615,514 B1 | 12/2013 | Fernandes et al. |
| 8,661,012 B1 | 2/2014 | Baker et al. |
| 8,661,029 B1 | 2/2014 | Kim et al. |
| 8,694,374 B1 | 4/2014 | Diligenti et al. |
| 8,694,511 B1 | 4/2014 | Corduneanu et al. |
| 8,738,596 B1 | 5/2014 | Kim et al. |
| 8,832,083 B1 | 9/2014 | Chen et al. |
| 8,898,152 B1 | 11/2014 | Ie et al. |
| 8,898,153 B1 | 11/2014 | Kim et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |

(56) References Cited

U.S. PATENT DOCUMENTS

| | | |
|---|---|---|
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0293950 A1 | 12/2006 | Meek et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0171943 A1 | 7/2009 | Majumder et al. |
| 2009/0182723 A1 | 7/2009 | Shnitko et al. |
| 2009/0228442 A1 | 9/2009 | Adams et al. |
| 2009/0287656 A1 | 11/2009 | Bennett |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2011/0087656 A1 | 4/2011 | Oh et al. |
| 2011/0219025 A1 | 9/2011 | Lipson et al. |
| 2011/0282906 A1 | 11/2011 | Wong |
| 2011/0295844 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| | | |
|---|---|---|
| WO | 01/67297 | 9/2001 |
| WO | 2004/059514 | 7/2004 |

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Gabriel Somlo et al., "Using Web Hepler Agent Profiles in Query Generation", ACM, Jul. 2003, pp. 812-818.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; ""Methods for comparing rankings of search engine results""; Computer Networks: The International Journal of Computer and Telecommunications Networking, Jul. 2006, vol. 50, Issue 10, 19 pages.

Boldi, et al.; *The Query flow Graph: Model and Applications;* CKIM '08, Oct. 26-30, Napa Valley, California, USA, pp. 609-617.

Boyan et al.; *A Machine Learning Architecture for Optimizing Web Search Engines*; Aug. 1996; Internet-based information systems—Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Cutrell, et al.; *Eye tracking in MSN Search: Investigating snippet length, target position and task types*; 2007; Conference on Human

(56) References Cited

OTHER PUBLICATIONS

Factors in Computing Systems—Proceedings of the SIGCHI Conference on Human Factors in Computing Systems.
Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Grčar, Miha, *User Profiling: Collaborative Filtering*, SIKDD 2004, Oct. 12-15, 2004, Ljubljana, Slovenia, 4 pages.
Hofmann, Thomas, *Latent Semantic Models for Collaborative Filtering*, ACM Transactions on Information Systems, vol. 22, No. 1, Jan. 2004, pp. 89-115.
Joachims et al., "Search Engines that Learn from Implicit Feedback"; Aug. 2007, IEEE Computer Society.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
Joachims; *Optimizing search engines using clickthrough data*; 2002; Proceedings of the ACM SIGKDD International Conference on Knowledge Discovery and Data Mining, p. 133-142.
Kelly, et al.; *Implicit Feedback for Inferring User Preference: A Bibliography*; SIGIR Forum, vol. 37, No. 2 (2003), pp. 18-28.
Lemire, Daniel, *Scale and Translation Invariant Collaborative Filtering Systems*, Published in Information Retrieval, 8(1), pp. 129-150, 2005.
Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.
U.S. Patent Office, U.S. Appl. No. 11/556,143, filed Nov. 2, 2006, in Office Action mailed Apr. 20, 2011, 18 pages.
U.S. Patent Office, U.S. Appl. No. 11/556,143, filed Nov. 2, 2006, in Office Action mailed Jan. 25, 2010, 14 pages.
U.S. Patent Office, U.S. Appl. No. 11/556,143, filed Nov. 2, 2006, in Office Action mailed Jul. 6, 2010, 20 pages.
U.S. Patent Office, U.S. Appl. No. 11/685,095, filed Mar. 12, 2007, in Office Action mailed Apr. 13, 2011, 31 pages.
U.S. Patent Office, U.S. Appl. No. 11/685,095, filed Mar. 12, 2007, in Office Action mailed Feb. 25, 2009, 21 pages.
U.S. Patent Office, U.S. Appl. No. 11/685,095, filed Mar. 12, 2007, in Office Action mailed Feb. 8, 2010, 31 pages.
U.S. Patent Office, U.S. Appl. No. 11/685,095, filed Mar. 12, 2007, in Office Action mailed Sep. 10, 2009, 23 pages.
Nicole, Kristen, Heeii is StumbleUpon Plus Google Suggestions, [online], Retrieved from the Internet http://mashable.com/2007/05/15/heeii/, 11 pages.
Radlinski, et al., *Query Chains: Learning to Rank from Implicit Feedback*, KDD '05, Aug. 21-24, 2005, Chicago, Illinois, USA, 10 pages.
U.S. Patent Office, U.S. Appl. No. 11/556,086 filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, Apr. 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Baeza-Yates, Ricardo, Carlos Hurtado, and Marcelo Mendoza. "Query recommendation using query logs in search engines." Current Trends in Database Technology—EDBT 2004 Workshops. Springer Berlin Heidelberg, 2005.
Velez, Bienvenido, et al. "Fast and effective query refinement." ACM SIGIR Forum. vol. 31. No. SI. ACM, 1997.
Mandala, Rila, Takenobu Tokunaga, and Hozumi Tanaka. "Combining multiple evidence from different types of thesaurus for query expansion." Proceedings of the 22nd annual international ACM SIGIR conference on Research and development in information retrieval. ACM, 1999.

TIME BASED RANKING

CROSS REFERENCE TO RELATED APPLICATIONS

This application is a continuation of and claims priority to U.S. patent application Ser. No. 11/870,893, filed on Oct. 11, 2007, the entire contents of which are hereby incorporated by reference.

BACKGROUND

This document relates to ranking content items responsive to a query and based on when the query is received.

The rise of the Internet has enabled access to a wide variety of content items, e.g., video and/or audio files, web pages for particular subjects, news articles, etc. Content items of particular interest to a user can be identified by a search engine in response to a user query. One example search engine is the Google search engine provided by Google Inc. of Mountain View, Calif., U.S.A. The query can include one or more search terms or phrases, and the search engine can identify and, optionally, rank the content items based on the search terms or phrases in the query and present the content items to the user (e.g., in order according to the rank).

Queries are sometimes ambiguous with respect to the interests of the users. For example, queries for "turkey" can return results related to the country of Turkey and results related to turkey recipes for Thanksgiving holidays in Canada and the United States. Accordingly, users may have to revise their queries one or more times until the search engine returns the content items that are of interest to the user.

SUMMARY

Apparatus, systems and methods for content item ranking are disclosed. In one implementation, click logs and query logs related to a query are analyzed. Historical click-through rates of content items are determined based on the analysis of the click logs and query logs. A temporal change during a historical time period for an historical click-through rate of a first content item relative to an historical click-through rate of a second content item is identified. A query can be received during another time period. If the another time period is related to the historical time period, the query can be disambiguated based on the temporal change.

In another implementation, click logs and query logs related to a query are analyzed. Historical click-through rates of content items based on the click logs and query logs are determined. Temporal changes for historical click-through rates of first content items relative to historical click-through rates of second content items for a historical time period are identified. Search results received from a search engine for the query during a related time period and that include least some of the content items are adjusted according to the temporal change.

In another implementation, a system includes a click-through engine and a temporal analyzer engine. The click-through engine accesses query logs related to queries and click logs related to content items and determines historical click-through rates for content items related to a query. The temporal analyzer engine identifies a temporal change in the historical click-through rate of a first content item relative to the historical click-through rate of a second content item for a first time period. The first and second content items are relevant to the query. The temporal analyzer causes the rankings of search results for the query that include at least the first content item to be adjusted during a second time period according to the temporal change, wherein the second time period is related to the first time period.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
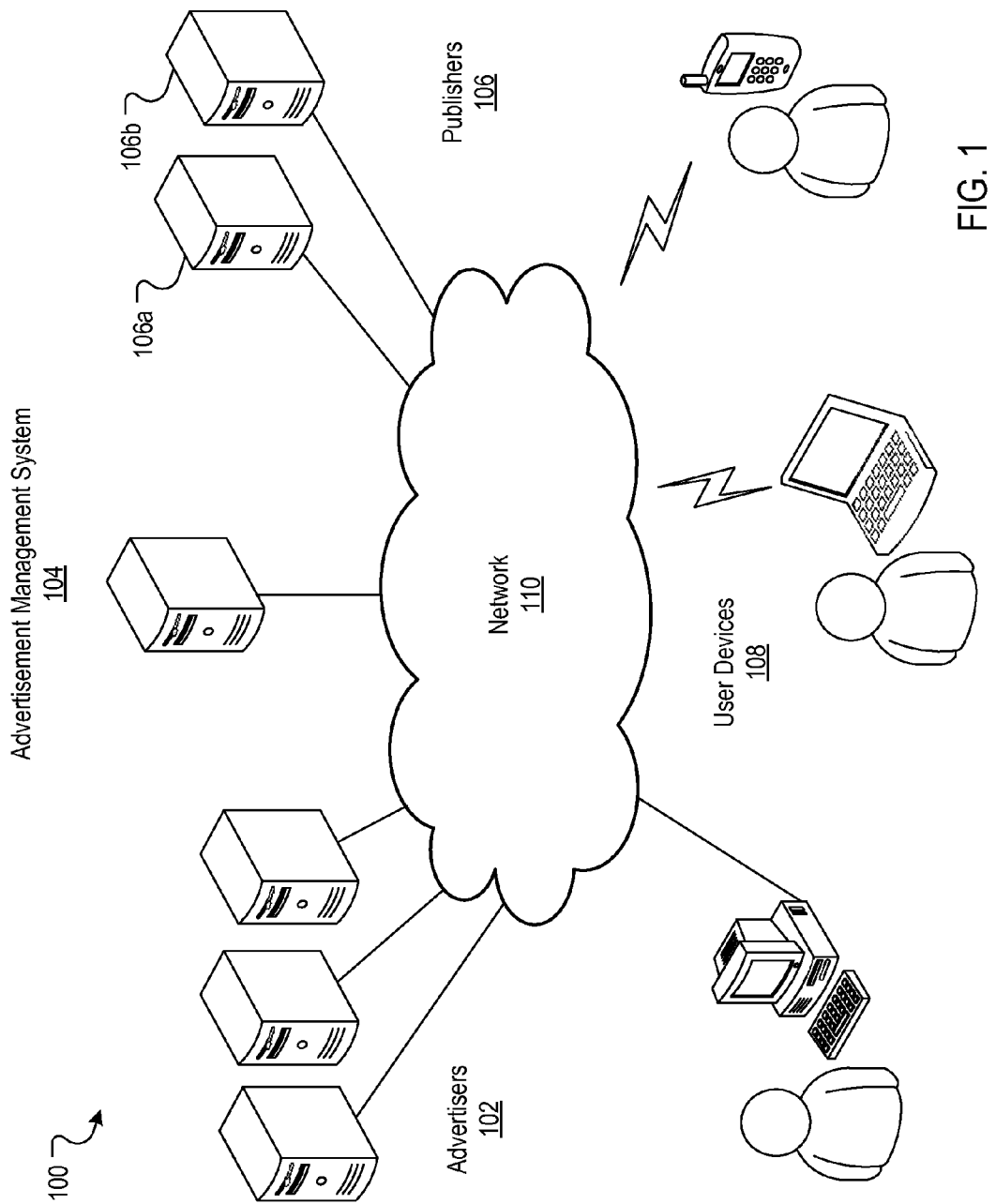
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102, an advertisement management system 104, publishers 106, and user devices 108.

In some implementations, the advertisers 102 can directly, or indirectly, enter, maintain, and track advertisement ("ad") information in an advertising management system 104. Though reference is made to advertising, other forms of content, including other forms of sponsored content, can be delivered by the system 100. The ads may be in the form of graphical ads, such as banner ads, text only ads, image ads, audio ads, video ads, ads combining one or more of any of such components, etc. The ads may also include embedded information, such as links, meta-information, and/or machine executable instructions. One or more publishers 106 may submit requests for ads to the system 104. The system 104 responds by sending ads to a requesting publisher 106 for placement on or association with one or more of the publisher's content items (e.g., web properties). Example web properties can include web pages, television and radio advertising slots, and even print media space.

One example publisher 106 is general content server 106a that receives requests for content (e.g., articles, discussion threads, music, video, graphics, search results, web page listings, information feeds, etc.), and retrieves the requested content in response to the request. The content server 106a may submit a request for ads to an advertisement server in the system 104. The ad request may also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information of a requesting device 108, etc. In some implementations, the content server 106a or a client browser can combine the requested content with one or more of the ads provided by the system 104. The combined content and ads can be sent/rendered on the user device 108 that requested the content for presentation in a viewer (e.g., a browser or other content display system).

Another example publisher 106b is a search service 106b. The search service 106b can receive queries from the user devices 108 for search results. In response, the search service 106b can derive relevant search results from an index of documents (e.g., from an index of web pages). An exemplary search service 106b is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results. The search results can be provided to the requesting user device 108.

In some implementations, the search service 106b can submit a request for ads to the advertising management system 104. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores, page rank scores, etc.), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

The search service 106b can combine the search results with one or more of the ads provided by the system 104. This combined information can then be forwarded to the user device 108 that requested the content. The search results can be maintained as distinct from the ads, so as not to confuse the user between paid ads and presumably neutral search results.

In some implementations, the search service 106b may rank the search results based on keywords in the user's query. The search service 106b may also consider user preferences and/or actions when determining the rankings. User preferences may be determined by different usage information provided to the search service. In some implementations, the user devices 108 can provide usage information to the search service, such as, for example, whether a click-through related to a content item has occurred, whether a conversion has occurred, or whether some other defined event has occurred. This usage information can include measured or observed user behavior related to content items that have been served by the publisher. Such usage information can be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

Users generally desire that the search results identify the content items that are most responsive to the user's query. However, what users actually consider to be responsive may fluctuate over time. For example, a particular content item may be determined to be highly responsive to users submitting queries on weekends, moderately responsive to users submitting queries on weekday evenings, but less responsive to users submitting queries on weekday mornings and afternoons, even when the same users are making the same queries at different times.

In some implementations, the search service 106b can identify a temporal change indicative of changes in users' interests for one content item over another content item that are responsive to the same query. A temporal change may be associated with a time period and/or a region. In some implementations, a temporal change is identified by analyzing the CTRs of content items related to the query. For example, the temporal change may be a change in the CTR of a content item responsive to a query relative to the CTR of another content item responsive to the same query over a time period, and for which the change exceeds a threshold. In some implementations, the ranking of the search results can be based in part on the temporal change.

Figure 2:
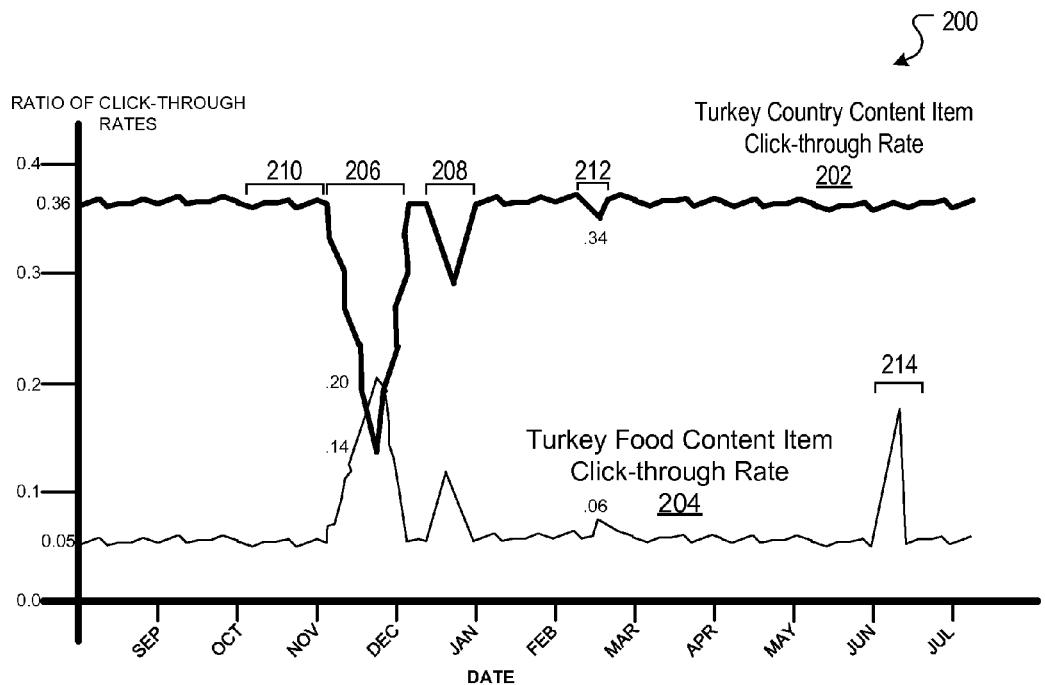
FIG. 2 is an example of a temporal change for click-through rates graph.

FIG. 2 is an example of a temporal change for click-through rates graph 200. The CTR graph 200 represents the historical weekly CTRs over a one year time period of two different content items that are responsive to the same query. By comparing the CTRs of the two content items and determining whether a value generated by the comparison exceeds a threshold, temporal changes in the CTRs of the content items during the one year time period can be identified.

The CTR 202 line represents the CTR of the first content item responsive to a query over a one year period, and CTR 204 line represents the CTR of the second content item responsive to the same query over the same one year period. For example, a query for "turkey" may return content items associated with vacation resorts in the country Turkey and content items associated with Thanksgiving turkey recipes. Although both sets of content items are responsive to a query for "turkey," users may click on the content items associated with the vacation resorts in Turkey more frequently than the content items associated with the Thanksgiving turkey recipes. For example, historical time period 210 is representative of the majority of historical time periods shown on the graph 200, with the exception of the historical time period 206 and the historical time period 208. During the historical time period 210, the CTR 202 indicates the CTR of a content item associated with the country Turkey as averaging 0.36, and the CTR 204 indicates the CTR of content items associated with Thanksgiving turkey recipes as averaging 0.05.

However, the CTRs of content items may change over time. The change in the CTR may be a daily change, weekly change, seasonal change, one time change, or change during any other periodic or aperiodic time period for which the CTR is measured. For example, the CTR 204 line indicates that the CTR of a content item associated with turkey recipes increases significantly during the historical time period 206 and the historical time period 208. This increase indicates that relatively more users are clicking on the content item associated with Thanksgiving turkey recipes during the time periods 206 and 208, likely a result of the increased demand for turkey recipes during Thanksgiving and Christmas holidays. Similarly, the CTR 202 line indicates that the CTR of a content item associated with the country Turkey decreases significantly during the same time period 206 and period 208, likely a result of the increased percentage of users clicking turkey recipes in the period 206 and period 208. The change in the CTR 202 and the CTR 204 is an example of a temporal change during the period 206 and the period 208.

In some implementations, the temporal change may be identified by recognizing a change in a ratio of the CTRs of the content items that exceeds a threshold. In some implementations, a click-fraction is used to quantify the ratio of the CTR of one content item relative to another content item. For example, a click-fraction quantifying the ratio of the CTR 202 to the CTR 204 during the historical time period 210 is:

$$\frac{CTR 202}{CTR 204} = \frac{0.36}{0.05} = 7.2 = \text{Click-fraction for the time period 210}$$

This click-fraction suggests that during time period 210, from a query for "turkey," users are 7.2 times more likely to click on the content item associated with vacation resorts in Turkey than with content item associated with Thanksgiving turkey recipes. In the graph 200, the click-fraction values are substantially the same for every month, except for the period 206 and the period 208. The click-fraction for the period 206 changes significantly from the click-fraction for the historical time period 210:

$$\frac{CTR 202}{CTR 204} = \frac{0.14}{0.20} = 7.0 = \text{Click-fraction for the time period 206}$$

This click-fraction suggests that during time period 206, from a query for "turkey," users are 1.4 times more likely to click on the content item associated with Thanksgiving turkey recipes than with the content item associated with vacation resorts in Turkey. The change in the click-fractions of the historical time periods 206 and 210 indicates that there may be a temporal change for the query for "turkey" during the period 206 for the content items associated with the CTR 202 and the CTR 204

In some implementations, a change in a click-fraction for a time period must exceed a minimum change threshold to be considered a temporal change. The minimum change threshold may be calculated by a formula or may be provided by a person or another system. For example, the standard deviation of the click-fractions of the time periods may be the minimum change threshold. If the standard deviation for the click-fractions of all the monthly periods of FIG. 2 is 2.56, any change in the click-fraction during a time period that deviates from the average CTR by more than the standard deviation can be considered a temporal change. Thus for the time period 206:

Average click-fraction=7.2
Minimum change threshold=2.56
Change in the click-fraction for the time period 206=7.2−0.7=6.5

Because the change in the click-fraction during the time period 206 compared to the baseline average, 6.5, exceeds the minimum change threshold, 2.56, it may be considered a temporal change. Conversely, during period 212, both the CTR 202 and the CTR 204 fluctuate but the change in the click-fraction during the period 212 is not significant enough:

$$\frac{0.34}{0.06} = 5.67 = \text{Click-fraction for the time period 212}$$

Average click-fraction=7.2
Minimum change threshold=2.56
Change in the click-fraction=7.2−5.67=1.53

Thus, during time period 212, the change in the click-fraction does not exceed the minimum change threshold of 2.56. Accordingly, the time period 212 is not considered to have a temporal change.

The difference between the change in the click-fraction and the minimum change threshold can also be used to determine the degree of the temporal change; the larger the difference, the more significant the change. For example, the graph 200 indicates that the CTR 202 and CTR 204 changed considerably during period 206 compared to during period 210, while the change was less significant during period 212 compared to during period 210. Accordingly, the difference between the minimum change threshold and the change in the click fraction during period 206, 6.5, is much greater than the difference between the minimum change threshold and the change in the click fraction during period 212, which is 1.53. The larger difference during period 206 is indicative of a larger temporal change in the CTRs of the content items during period 206.

Other methods of determining a threshold value can also be used. For example, an average of CTR's over multiple historical time periods can be determined, and an average of the click fraction (or some other central tendency of the click fraction) over the periods can likewise be determined. If the click fraction for a monthly period deviates from the average click fraction by a certain percentage, e.g., 20% of the average click fraction, then that time period can be determined to have a temporal change.

Although a temporal change can be identified for a change in the click fraction comparing the CTR of one content item during a time period relative to the CTR of another content item during the same time period, a temporal change may also be identified for a change in the CTR of a content item during a time period relative to the CTR of the same content item during other time periods. For example, during time period 214 the CTR 204 changes significantly relative to the CTR 204 during period 210. This variation in the CTR 204 may be determined to be a temporal change during the period 214.

Figure 3:
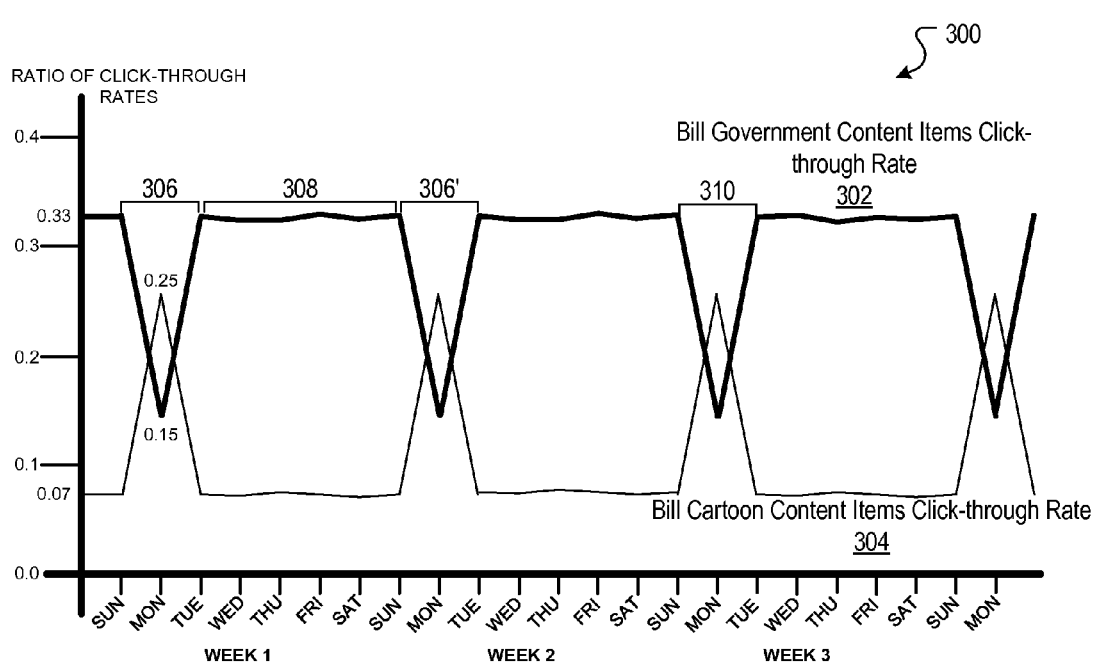
FIG. 3 is another example of a temporal change for click-through rates graph.

FIG. 3 is another example of a temporal change for click-through rates graph 300. The graph 300 represents the daily CTRs over a historical three week time period of two different groups of content items that are responsive to the same query. By comparing the CTRs of the two groups of content items, temporal changes in the CTRs during the three week time period can be identified. The graph 300 is similar to the graph 200 of FIG. 2, except that the graph 300 is identified through multiple weekly periods, and the lines for CTR 302 and 304 correspond to groups of content items.

The CTR 302 line represents the CTR of the first group of content items, and CTR 304 represents the CTR of the second group of content items. For example, a query for "bill" may return content items associated with a draft statute, called a "bill," and content items associated with a cartoon character named Bill. Although both sets of content items are related to a query for "bill," during certain time periods users may click on the content items associated with the draft statute more frequently than the content items associated with Bill the cartoon character. For example, from a query for "bill," during daily period 308, the CTR of content items associated with the draft statute, CTR 302, averages 0.33 and the CTR of content items associated with Bill the cartoon character, CTR 304, averages 0.07.

The CTRs of the content items may change hourly, weekly, biweekly, monthly, etc. In graph 300, a weekly change in the CTR 302 and the CTR 304 during the Monday time period 306 is of substantial enough magnitude to be considered a temporal change. The temporal change during period 306 may arise because the cartoon is shown on television on Monday, which results in an increased interest in Bill the cartoon character during the period 306. This temporal change repeats weekly, and may be used to predict the next period of a temporal change, e.g. the time period 306'.

Figure 4:
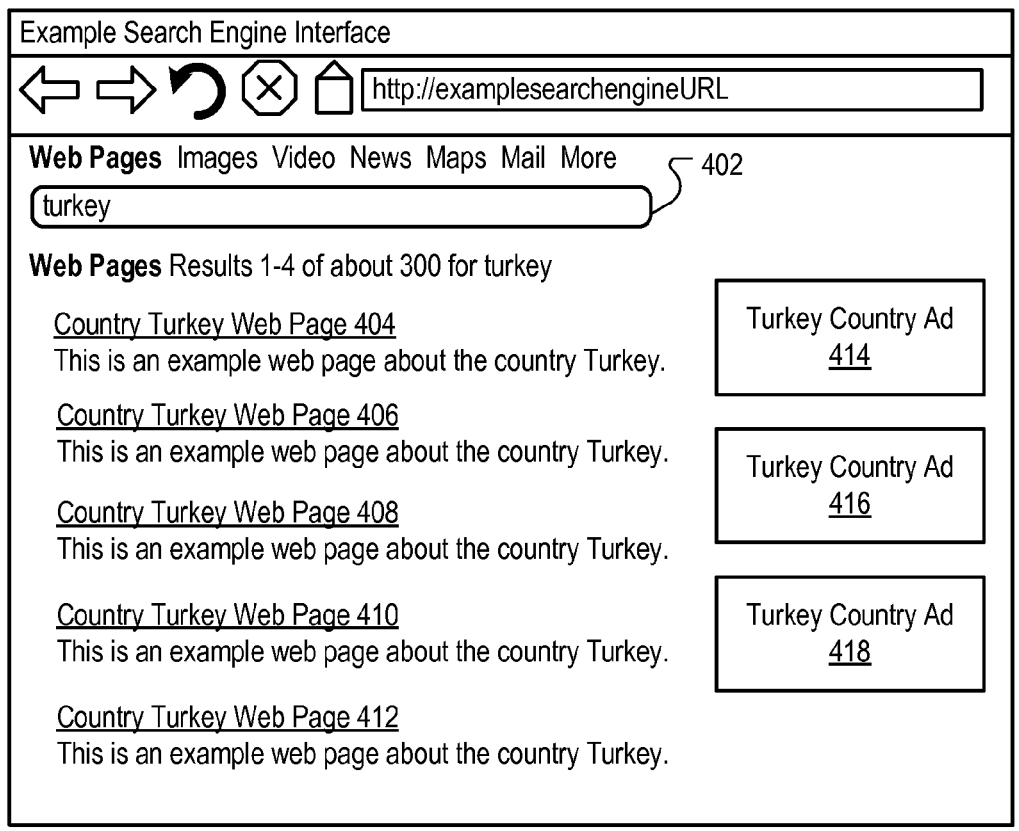
FIG. 4 is an example screen shot of search results.
Figure 5:
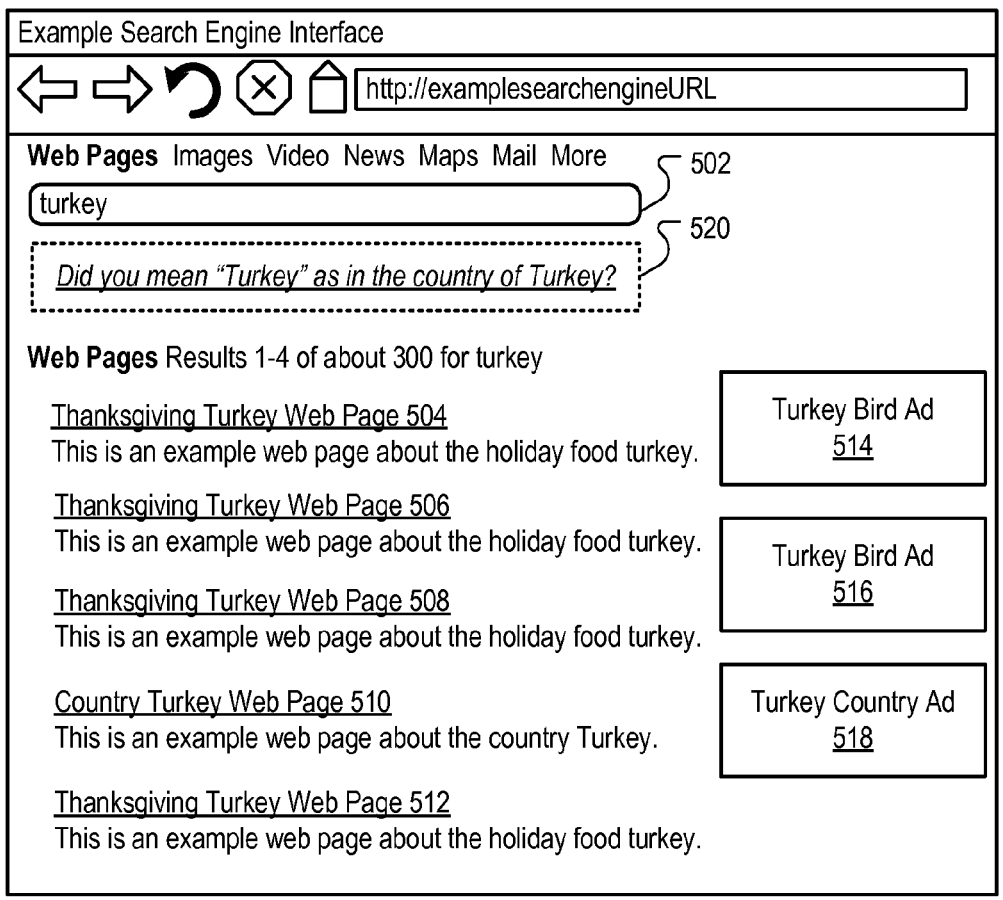
FIG. 5 is another example screen shot of search results.

Identification of a temporal change during a historical time period can facilitate modification of rankings of search results responsive to a query during other time periods that are related to the historical time periods for which a temporal change is identified. Examples of such other time periods are time periods that are of the same or substantial period as the historical time period, e.g., same days of week, same annual holidays such as July 4th holiday, Thanksgiving holiday, Christmas holiday, etc. FIGS. 4 and 5 illustrate such a modification.

FIG. 4 is an example screen shot of search results 400. The search results 400 can, for example, be search results from a search engine in time periods not affected by a temporal change, e.g. a time period related to the historical time period 210 of FIG. 2.

For example, a search engine may rank content items related to vacation resorts in Turkey higher than content items related to Thanksgiving turkey recipes when the queries for "turkey" during the month of May. The search engine may rank Country Turkey Web Page 404 as the highest content item in a query 402 for "turkey." Additionally, the search engine may rank the next seven content items related to vacation resorts in Turkey, Country Turkey Web Pages 406, 408, 410 and 412, and Turkey Country Ads 414, 416 and 418, higher than any content related to Thanksgiving turkey recipes.

FIG. 5 is another example screen shot of search results 500. The search results 500 can, for example, be search results from a search engine during a time period when the search results are ranked in response to a temporal change, e.g., during a time period that is related to the historical time period 206 of FIG. 2, such as the month of November, or a week in November.

For example, when there is a temporal change with an increase in the CTR of content items associated with Thanksgiving turkey recipes, and a query that is relevant to the content items is submitted during the time period defined by the temporal change, i.e., any November month, the search engine may rank Thanksgiving turkey recipe content items higher than content items associated with vacation resorts in Turkey. Thus, in the search results 500, generated during the time period of the temporal change, Thanksgiving Turkey Web Page 504 may rank as the highest content item in a query 502 for "turkey." The search engine may rank the five of the next seven content items related to Thanksgiving turkey recipes, i.e., Thanksgiving Turkey Web Pages 506, 508, and 512 relatively higher than the rankings of the same content items during periods of no temporal change.

Such ranking adjustments can be implemented within a search engine. In some implementations, one or more search engine variables related to ranking a content item in response to a query can be adjusted based on an identified temporal change. Thus, if the search engine generates rankings based on a product of a page rank and an information retrieval score, one or more of the IR scores and page ranks scores can be adjusted to increase or decrease the ranking of a search result during the period of the temporal change. Other search algorithms can likewise be adjusted in a similar manner.

Other content items can also be adjusted based on a temporal change. For example, advertisement ranking may also be adjusted based on a temporal change. As shown in FIG. 5, Turkey Bird Ads 514 and 516 are ranked ahead of the Turkey Country Ad 518. Such adjustments can be based on relevance, e.g., if the advertisements are ranked, in part, on a relevance of the advertisement to a query, then the relevance (and thus the ranking) of an advertisement can be adjusted in a similar manner that the search results are adjusted. Other methods of adjusting advertisement rankings can also be used, e.g., adjusting bid requirements, adjusting quality requirements, etc.

In some implementations, the search results can be received from the search engine and adjusted based on an identified temporal change. For example, the search engine may rank the search results without considering the time period during which the query was submitted. The search results can be processed by a ranking filter that can re-rank some or all of the search results accordingly.

In some implementations, the ranking adjustments can correspond to the magnitude of the temporal change. For example, if the temporal change indicates a significant change in the CTRs of the first content items to second content items such that the CTRs of the first content items are higher than the CTRs of the second content items, such as during the time period 206 of FIG. 2, then the first content items can be ranked higher than the second content items. Similarly, if the temporal change is less significant, e.g., the CTRs of the first content items relative to the CTRs second content items increase but are still less than the CTRs of the second content items, such as during the time period 208 of FIG. 2, then the rankings of the first content items can be increased, but still remain less than the rankings of the second content items.

Figure 6A:
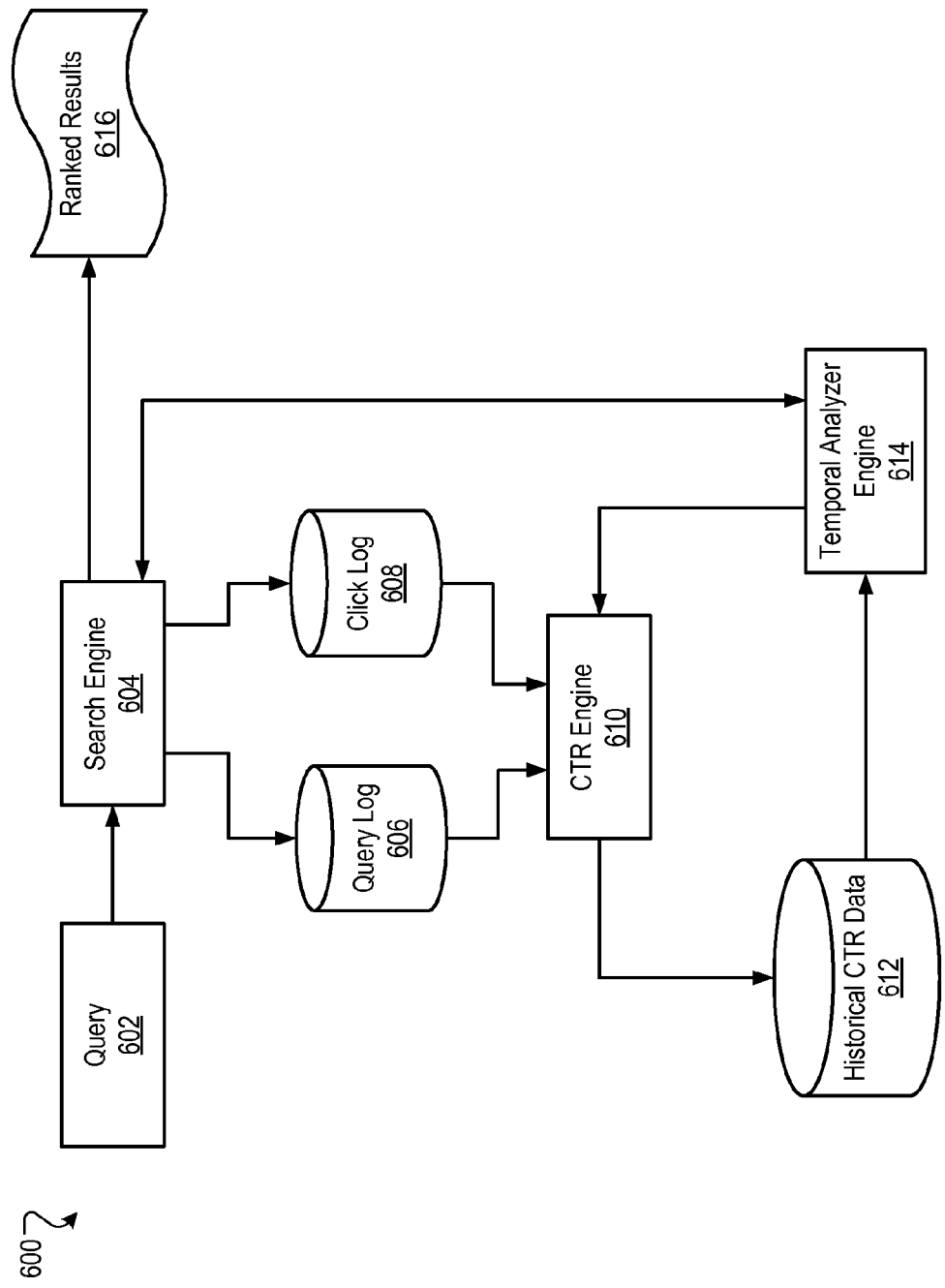
FIG. 6a is a block diagram of an example content identification system.

FIG. 6a is a block diagram of an example content identification system 600. The system 600 can, for example, be used to distinguish content items responsive to the same query, based on identified temporal changes. The system may be implemented as part of a search engine, or as a separate component or system that communicates with a search engine.

As an overview, the system 600 can select a query from a query log and identify content items responsive to the query. The system 600 can process click logs related to the identified content items served in response to the query and determine CTRs for the respective content items over a series of time periods, e.g., daily CTRs over a one-year period; weekly CTRs over a two year period, etc. The CTRs of each of the content items during the time periods can be compared for each time period. If the change of a CTR for a content item relative to the CTR of another content item for a period exceeds a threshold, then a temporal change for those content items can be identified for the period. The system 600 can then adjust the ranking of the content items for search results for the same query submitted during another time period that is related to the time period of the temporal change.

In an implementation, a CTR engine 610 accesses a query log 606 and a click log 608 to generate historical clickthrough data 612 for content items related to a query 602. The query log 606 stores the keywords used in the query 602 and in past queries. The click log 608 stores the number of clicks different content items have received when identified in response to different queries and the number of times the content items have been presented as search results relevant to the queries. The CTR engine 610 uses the data from the query log 606 and the click log 608 to generate the historical CTR data 612 for content items related to the query. For example, the query log 606 may store queries with the keyword "turkey", and the click log 608 may store the number of presentations to and the number of clicks received from the users for content items, e.g., content items that are associated with Thanksgiving turkey recipes and content items that are associated with vacation resorts in Turkey. The CTR engine 610 may access the query log 606 and click logs 612 and generate historical CTR data 612 related to the query for the keyword "turkey."

In some implementations, a temporal analyzer engine 614 analyzes the historical CTR data 612 for the different content items responsive to the query 602 and identifies temporal changes in the CTRs of the content items responsive to the same query during a time period. For example, the temporal analyzer engine 614 may identify an increase in the CTR for the content items associated with Thanksgiving turkey recipes during the month of November over several years. Similarly, the temporal analyzer engine 614 may identify a decrease in the CTR for the content items associated with resort locations in the country of Turkey during November over the same several years. Thus The temporal analyzer engine 614 may identify the month of November as a time period during which a temporal change for the two content items responsive to a query for "turkey." Because the time period is substantially periodic, i.e., occurring during the month of November, the temporal analyzer engine 614 can determine that the temporal change is to be used to adjust the ranking of content items during the same period in the future, e.g., during each month of November.

In some implementations, the search engine 604 identifies content items responsive to a query, and then ranks the content items in response to the temporal change identified by the temporal analyzer engine 614 to provide the most relevant search results in ranked results 616. For example, for the single-word query "turkey," results related to vacation resorts in the country Turkey may generally be ranked higher than results related to Thanksgiving turkey recipes. However, because there may be a temporal change in the CTR for content items containing Thanksgiving turkey recipes during November, rankings of the content items can be modified. For a query for "turkey," the content items associated with Thanksgiving turkey recipes may be ranked relatively higher in the ranked results 616 during November to reflect the increased CTR of Thanksgiving related content items. The adjustment can be implemented within the search engine 604 or external to the search engine 604 as described with reference to FIG. 5.

The identification of a temporal change for a query and responsive content items and the adjustment of the search results for the time period of the temporal change can thus disambiguate the query, i.e., provide adjusted search results that are more likely to be related to the users' current interests. Other methods of disambiguating a query can also be used. For example, in some implementations, the search engine 604 may rely on the CTR engine 610 and/or the temporal analyzer engine 614 to identify keywords to disambiguate the query, and provide the keywords to the search engine 604 with the query 602. The keywords may be identified by the temporal analyzer engine 614 or the search engine 604 as keywords related to the content items subject to a temporal change.

For example, if the temporal analyzer engine 614 determines that there is a temporal change in CTRs favoring a first set of content items, the first set of content items can be evaluated, e.g., text mined, to determine corresponding keywords related to the content items. Thus, if the first set of content items are related to Thanksgiving turkey recipes, the temporal analyzer engine 614 can provide the search engine with additional keywords to include in the query, such as "recipe," "Thanksgiving," etc., when the query is received during the Thanksgiving time period. In a variation of this implementation, an alternative query directed to the second set of content items can be optionally shown with the search results during the time period of the temporal change. For example, as illustrated by the dashed user interface element 520, an alternate query related to the country of Turkey can be submitted to the search engine upon selection by a user, the processing of which would generate the search results of FIG. 4.

In some implementations, the historical CTR 612 data can be processed for time periods of different durations. The historical CTR data 612 may identify the CTR of a content item over a first time period, e.g., hourly, and can be aggregated into additional time periods, e.g., daily, weekly, monthly, etc.

In some implementations, the CTR engine 610 and/or the temporal analyzer engine 614 can identify temporal changes based on a lunar calendar, a Gregorian calendar, or other periods. For example, the historical CTR data 612 may identify a decrease in the CTR of content items associated with food for a particular query during the month of Ramadan, a Muslim month of fasting based on the lunar calendar, and likewise identify an increase in the CTR of content items for the query associated fasting during Ramadan. Likewise, the temporal changes that occur only on the day of Thanksgiving in the United States, i.e., the fourth Thursday of November in the United States, can also be identified and correlated to the occurrence of the holiday.

In some implementations, the historical CTR data 612 may also be stored for different geographical regions as historical regional CTR data. The historical regional CTR data may identify the CTR during a time period of a content item in a city, state, country, or other regional categorization. If the historical CTR data 612 identifies different regions, the temporal analyzer engine 614 may identify temporal changes on a regional basis during a time period. For example, the historical CTR data 612 may identify an increased CTR for content items associated with Thanksgiving turkey recipes during November for queries received from the United States. Conversely, such a temporal change may not be identified for queries received from Japan in November.

In some implementations, the historical CTR data 612 may also include time zone data to facilitate the identification of temporal changes during a time period in a time zone of a content item. For example, a temporal change for content items associated with the query "eggs" might be identified between 7:00 AM and 8:00 AM for a time zone, and may occur across each time zone at the same respective time. Thus, for queries submitted between the time of 7:00 AM and 8:00 AM in each time zone, content items for egg recipes and restaurants with breakfast menus may be ranked higher than content items that include other information about eggs. Conversely, for queries submitted after 8:00 AM in each time zone, content items for egg recipes and restaurants with breakfast menus may be ranked lower than content items that include other information about eggs.

In some implementations, the CTR engine 610 and/or the temporal analyzer 614 can group content items with similar CTR behavior during a time period according to a category. There are a number of ways that the category of a content item may be identified. For example, in some implementations, content items may be mapped to predefined categories by the search engine 604, and if the majority of content items exhibiting a similar CTR behavior during a time period belong to a predefined category, then the content items can be identified as belonging to the predefined category. In other implementations, categories can also be determined by empirical data. A group of content items that have similar CTR patterns for the query "turkey," can be categorized together by the CTR engine 610 and/or the temporal analyzer 614.

In some implementations, rankings for all content items belonging to a category can be adjusted during a time period of a temporal change for a query. For example, the temporal analyzer engine 614 may identify a temporal change associated with all content items in a category of content items, where those content items are responsive to a query for "turkey" during November. For example, if a content item associated with deep fried turkey recipes is identified as being in the same category as a content item associated with a turkey stuffing recipes, both of those content items can be rank-adjusted based on a temporal change identified for the category.

The search engine 604, CTR engine 610 and temporal analyzer engine 614 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The engines 604, 610 and 614 can be implemented separately, or can be implemented as a single software entity. The engines 604, 610 and 614 can also be distributively implemented by multiple computers communicating with each other over a network, such as in a server farm, or can be implemented in a single computer device.

Figure 6B:
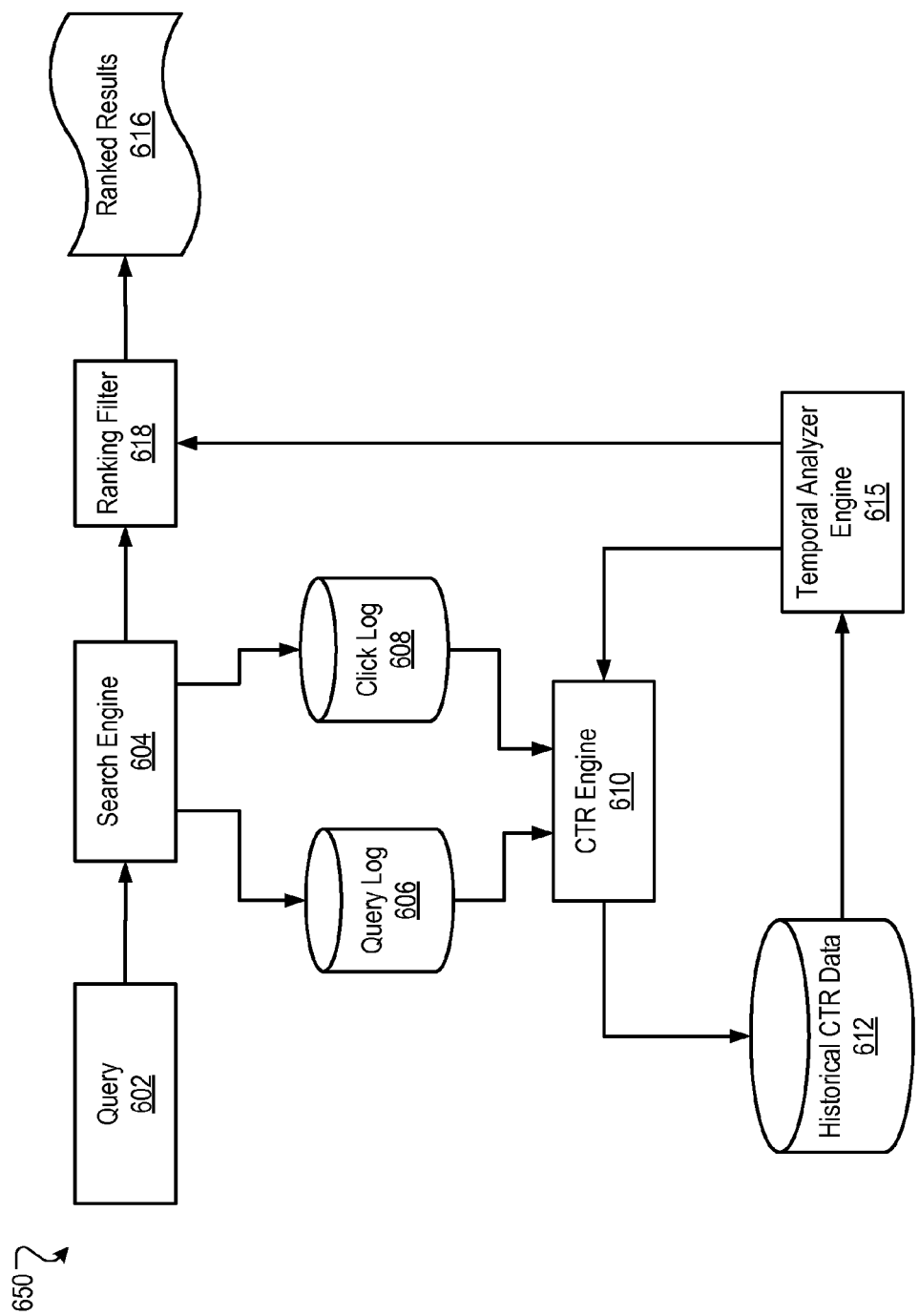
FIG. 6b is a block diagram of another example content identification system.

FIG. 6b is a block diagram of another example content identification system 650. The system 650 is similar to the system 600 from FIG. 6a, except the system 650 includes a ranking filter 618 that may be used to adjust the results of the search engine 604 to generate the ranked results 616. The search results can be received from the search engine 604 and adjusted by the rank filter 618 based on an identified temporal change.

In some implementations, the temporal analyzer engine 615 uses the historical CTR data 612 to identify a temporal change, which the temporal analyzer engine 615 communicates to the filter 618. For example, when the temporal analyzer engine 615 identifies a temporal change in the CTR during November of content items related to Thanksgiving turkey recipes, the temporal change is communicated to the filter 618. The search engine 604 may continue to rank content items related to vacation resorts in Turkey higher than content items related to Thanksgiving turkey recipes, even though the temporal change identifies a higher CTR for Thanksgiving related content items during November.

The filter 618 may then modify the search results from the search engine 604 by adjusting the ranking the search results from the search engine 604 to reflect the temporal change in CTRs of the content items during the time period of the temporal change. For example, the filter 618 can analyze the search results received from the search engine 604 during a period related to temporal change to identify the content items having CTRs that define the temporal change. The filter can then adjust the rankings during the time period related to temporal change so that content items that have a CTR increase are ranked higher than during a period of no temporal change, and content items that experience a CTR decrease are ranked lower than during a period of no temporal change. The modified results can be ranked results 616.

For example, as a result of a query for "turkey," the search engine 604 may rank content items related to vacation resorts in Turkey higher than content items related to Thanksgiving turkey recipes. As in system 600, a temporal change of the two content items responsive to a query for "turkey" during November may be identified by the temporal analyzer engine 615. However, in system 650, the temporal change is communicated to the filter 618, and the filter 618 can re-rank the search results from the search engine 604 during the time period of the temporal change so that content items for Thanksgiving turkey recipes are ranked higher than content items related to vacation resorts in the country Turkey.

The search engine 604, CTR engine 610, temporal analyzer engine 615 and the filter 618 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The components 604, 610, 615 and 618 can be implemented separately, or can be implemented as a single software entity. The components 604, 610, 615 and 618 can also be distributively implemented over a network, such as a server farm, or can be implemented in a single computer device.

Figure 7:
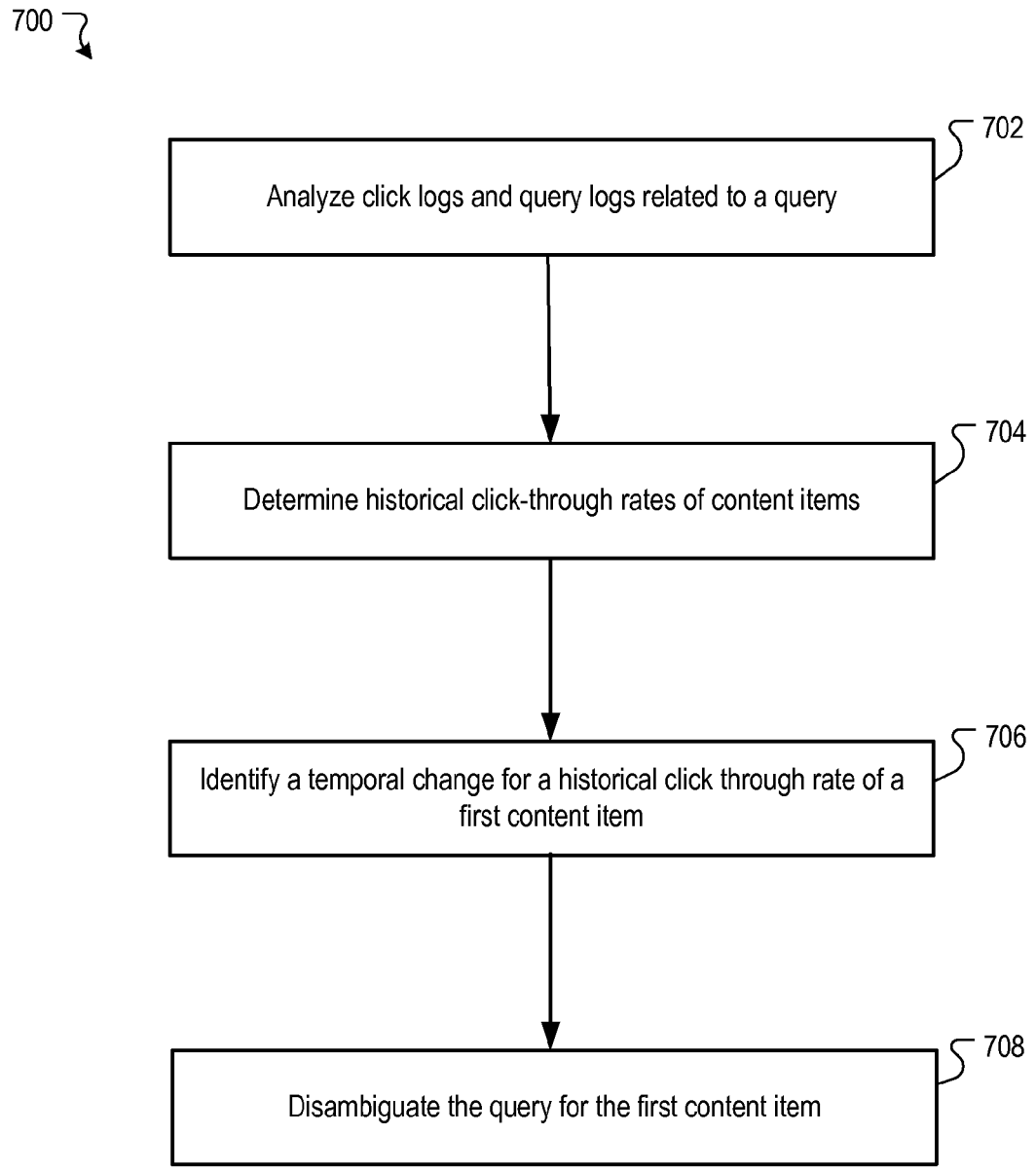
FIG. 7 is a flow diagram of a content ranking process.

FIG. 7 is a flow diagram of a content ranking process 700. The process 700 can, for example, be implemented by the system 600 of FIG. 6 or the system 650 of FIG. 6b.

Stage 702 analyzes click logs and query logs related to a query. For example, a server device such as the CTR engine 610 may access the query logs 606 and click logs 608 related to a query 602 for "turkey." In some implementations, all received queries are selected for evaluation. In other implementations, only queries that exceed a submission threshold, e.g., queries that are most frequently submitted, are selected for evaluation.

Stage 704 determines historical click-through rates of content items. For example, the CTR engine 610 may determine the historical CTR of content items responsive to the query 602 for "turkey," such as content items associated with vacation resorts in Turkey and content items associated with Thanksgiving turkey recipes. The historical CTR data 612 may be stored by different time periods, by category, by region, or by any other grouping specified by the temporal analyzer engine 614 or 615.

Stage 706 identifies a temporal change for an historical click-through rate of a first content item. For example, the historical CTR of the first content item may be compared to the historical CTR of a second content item for a historical time period. If the historical CTR of the first content item has substantially changed relative to the historical CTR of the second content item during the historical time period, there is a temporal change in the CTRs during the historical time period. For example, the temporal analyzer engine 614 or 615 may identify the time periods when the historical CTR data 612 for "turkey" queries is indicative of a higher CTR for content items associated with Thanksgiving turkey recipes and a lower CTR for content items associated with vacation resorts in Turkey. Any such time periods are the period of a temporal change in the CTRs of the content items.

In some implementations, the historical CTRs of content items can be compared for all identified content items. In other implementations, the historical CTRs of content items having CTR values that exceed a minimum threshold can be compared to exclude underperforming content items. In other implementations, the historical CTRs of content items that have been served in excess of a minimum number of times over a period can be compared to exclude very unique content items. Other selection processes can also be used.

Stage 708 disambiguates the query for the first content item, i.e., provides adjusted search results that are more likely to be related to the users' current interests. For example, the temporal analyzer engine 614 or the filter 618 may adjust the results of a search engine 604 to rank content items related to Thanksgiving turkey recipes higher than content items related to vacation resorts in Turkey during another time period that is related to the historical time period having an identified temporal change. The temporal analyzer engine 614 may alternatively provide or augment a query to the search engine that is directed to the content items related to the temporal change. For example, the temporal analyzer engine 614 may provide a query for "Thanksgiving turkey" for an initial query of "turkey" during another period associated with a temporal change, e.g., a month of November.

Figure 8:
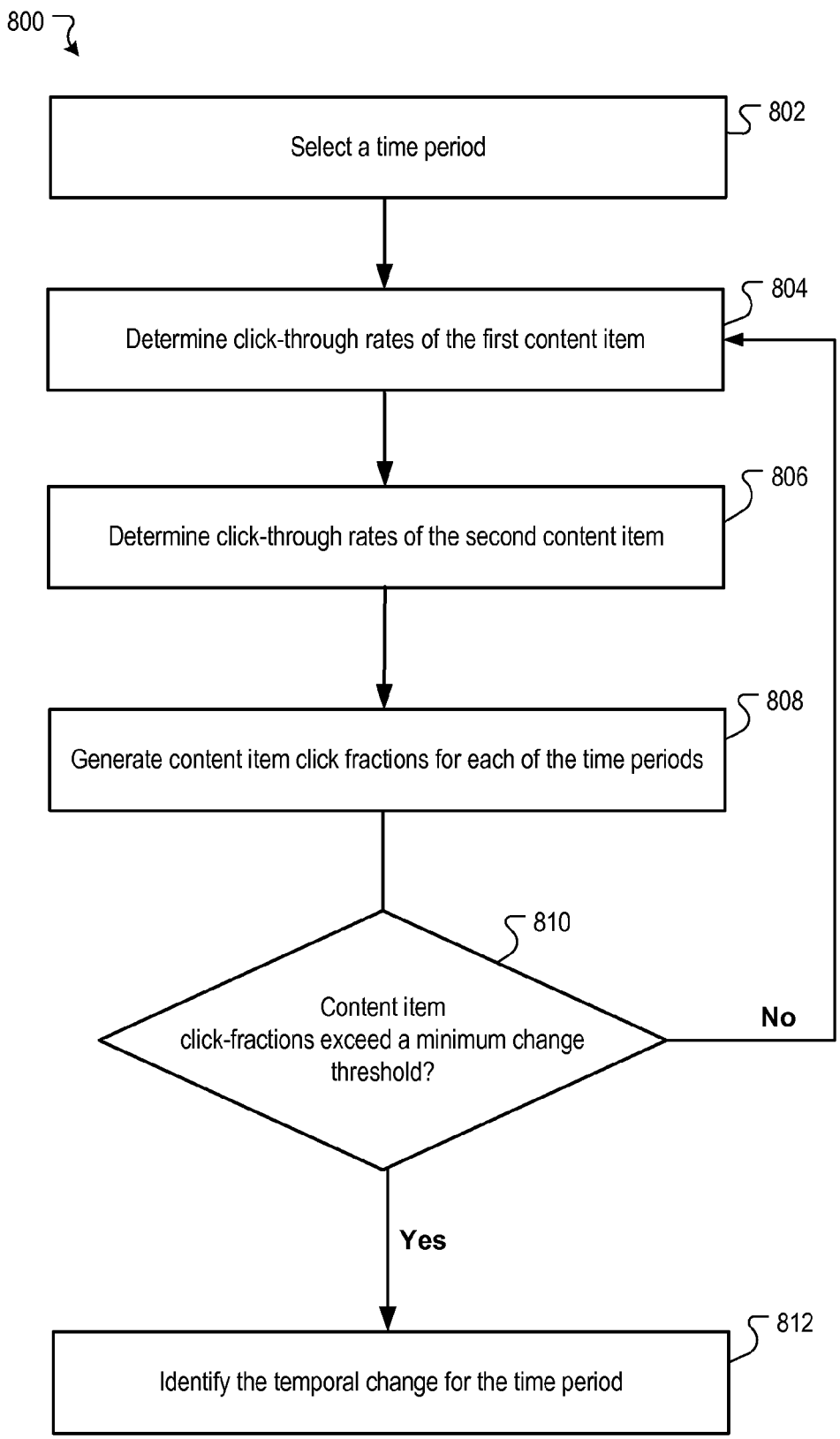
FIG. 8 is a flow diagram of another content ranking process.

FIG. 8 is a flow diagram of another content ranking process 800. The process can, for example, be implemented by the content ranking system 600 of FIG. 6a or the content ranking system 650 of FIG. 6b.

Stage 802 selects a time period for analysis. For example, the temporal analyzer engine 614 or 615 can select historical hourly, daily, weekly, or monthly calendar time periods, or any other periodic or substantially periodic time periods. Multiple time periods can be processed, e.g., 52 time weekly time periods for a year of query-log data and click-log data.

Stage 804 determines click-through rates of the first content item responsive to a query. For example, the CTR engine 610 can determine the CTRs of a first content item during the time periods selected by the temporal analyzer engine 614 or 615. For example, the CTR engine 610 may determine the weekly CTR of a content item related to Thanksgiving turkey recipes during every week for which there is historical CTR data.

Stage 806 determines click-through rates of the second content item. For example, the CTR engine 610 can determine the CTRs of a second content item during the same time periods selected by the temporal analyzer engine 614 or 615, e.g., the CTR engine 610 may determine the weekly CTR of a content item related to vacation resorts in Turkey during every week for which there is historical CTR data.

Stage 808 generates content item click-fractions for each of the time periods. For example, the click-fraction may represent a ratio of the CTR of a content item associated with Thanksgiving turkey recipes to the CTR of a content item associated with vacation resorts in Turkey.

Stage 810 determines whether the content item click-fractions exceed a minimum change threshold. For example, the temporal analyzer 614 or 615 can identify if the weekly click-fraction comparing two content items responsive to the query for "turkey" is greater than the average click-fraction for the two content items stored in the historical CTR data 608 by an amount exceeding the minimum change threshold.

If stage 810 determines that any of the content item click-fractions exceed a minimum change threshold, stage 812 identifies the temporal change for the historical time period. For example, if the temporal analyzer engine 614 or 615 determines that the click-fraction during November for the two content items responsive to a query for "turkey" exceeds the average click-fraction by more than the minimum change threshold, then a temporal change has been for the content items during November.

If the temporal change does not exceed the minimum change threshold, the CTR engine 610 identifies another content item to compare the first content item against. For example, if no temporal change occurred for any of the Thanksgiving related content items when compared to the content items related to vacation resorts in Turkey, the CTR engine may restart the process at stage 806 by comparing the CTR of vacation resorts in Turkey to the CTR of a clothing brand that uses a turkey as the logo and is also responsive to a query 602 for "turkey."

Figure 9:
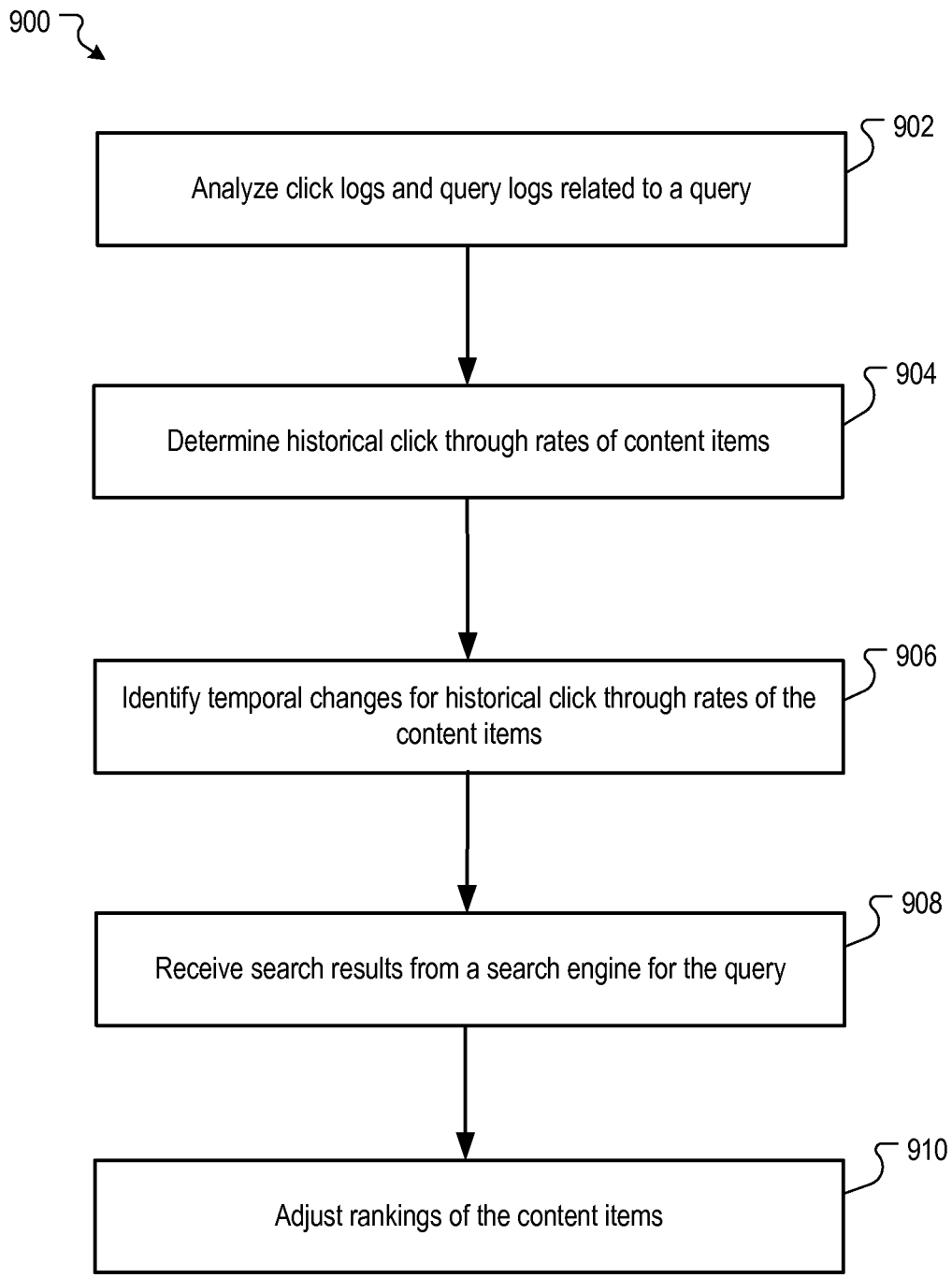
FIG. 9 is a flow diagram of another content ranking process.

FIG. 9 is a flow diagram of another content ranking process 900. The process can, for example, be implemented by the content ranking system 650 of FIG. 6b.

Stage 902 analyzes click logs and query logs related to a query. For example, a server device such as the CTR engine 610 may access the query logs 606 and click logs 608 related to a query 602 for "turkey."

Stage 904 determines historical click-through rates of content items. For example, the CTR engine 610 may determine the historical CTR of content items related to the query 602 for "turkey", such as content items associated with vacation resorts in Turkey and content items associated with Thanksgiving turkey recipes. The historical CTR data 612 may be stored by different time periods, by category, by region, or by any other grouping specified by the temporal analyzer engine 615.

Stage 906 identifies temporal changes for historical click-through rates of the content items. The historical CTR of different content items can be compared to identify any temporal changes in the CTRs. If the historical CTR of one content item has changed relative to the historical CTR of another content item during a time period, there is a temporal change in the CTRs of the content items during the time period. For example, the temporal analyzer engine 615 may identify the time periods when the CTR for content items associated with Thanksgiving turkey recipes is higher than average, or the CTR for content items associated with vacation resorts in Turkey is lower than average. Based on this comparison, the temporal analyzer engine 615 may identify the month of November as the time period of a temporal change.

Stage 908 receives search results from a search engine for the query. For example, the filter 618 may receive search results from the search engine 604 from a query for "turkey." The search results may include content items associated with Thanksgiving turkey recipes and content items associated with vacation resorts in Turkey.

Stage 910 adjusts rankings of the content items. For example, during a time period that is related to a historical time period of an identified temporal change for content items, the filter 618 can adjust the rankings of content according to the temporal change. As previously described, the filter 618 can facilitate a higher ranking to content items associated with Thanksgiving turkey recipes during November, the period identified by stage 906 as the period of a temporal change. Similarly, the filter 618 can facilitate a lower ranking to a second content item related to vacation resorts in Turkey during the same time period to reflect the lower CTR of the second content item during November.

While implementations have been described in which CTRs are used to identify a temporal changes during a time period for content items responsive to a query, other methods of identifying temporal changes can be also used. For example, one alternative method of identifying a temporal change includes human identification and evaluation of queries and responsive content items and identification of the temporal changes that become apparent during time periods.

Additionally, in some implementations a map search service is used in addition to or instead of a search service. The map search service identifies locations on the map that are more responsive to a map query during a time period. For example, the map search service may identify responsive restaurant locations as those that are open during a time period.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    determining historical click-through rates over a plurality of time periods for a first search result responsive to a query and for a second search result responsive to the query wherein the first and second search results refer to different respective web pages;
    calculating click-fractions for one or more of the plurality of time periods based on the determined historical click-through rates of the first and second search results;
    determining that a particular click-fraction of the calculated click-fractions in a first time period of the plurality of time periods exceeds a minimum change threshold;
    receiving the query from a user during a second time period that chronologically follows the plurality of time periods;
    obtaining search results responsive to the query;
    adjusting a ranking of the first search result in the obtained search results during the second time period; and
    providing the search results including the adjusted ranking of the first search result to the user.

2. The method of claim 1, wherein the adjustment of the ranking of the first search result is in proportion to a magnitude of a change of the historical click-through rate of the first search result relative to a change of the historical click-through rate of the second search result during the first time period.

3. The method of claim 1, further comprising:
    identifying a keyword related to the first search result; and
    adding the keyword to the query when the query is submitted to a search engine during the second time period.

4. The method of claim 1, wherein the determined historical click-through rates are for a first geographic region.

5. The method of claim 4, wherein adjusting the ranking of the first search result further comprises determining that a region from which the query is received is the first geographic region.

6. The method of claim 1, wherein a click-fraction of the calculated click fractions is a ratio of the determined historical click-through rate of the first search result in the time period to the determined historical click-through rate of the second search result in the time period.

7. The method of claim 1, wherein the first time period and the second time period are corresponding periods based on a lunar calendar or a Gregorian calendar.

8. The method of claim 1, wherein the first time period and the second time period are each a same day of a week, same days of a week, same annual holidays, same weeks of a month, same weeks of a year, same biweekly periods of a year, same months of a year, or same seasons of a year.

9. The method of claim 1, wherein the minimum change threshold is a standard deviation of the calculated click-fractions.

10. The method of claim 1, wherein the obtained search results include the first search result.

11. A system comprising at least one:
    data processing apparatus programmed to perform operations comprising:
        determining historical click-through rates over a plurality of time periods for a first search result responsive to a query and for a second search result responsive to the query wherein the first and second search results refer to different respective web pages;
        calculating click-fractions for one or more of the plurality of time periods based on the determined historical click-through rates of the first and second search results;
        determining that a particular click-fraction of the calculated click-fractions in a first time period of the plurality of time periods exceeds a minimum change threshold;
        receiving the query from a user during a second time period that chronologically follows the plurality of time periods;
        obtaining search results responsive to the query;
        adjusting a ranking of the first search result in the obtained search results during the second time period; and
        providing the search results including the adjusted ranking of the first search result to the user.

12. The system of claim 11, wherein the adjustment of the ranking of the first search result is in proportion to a magnitude of a change of the historical click-through rate of the first search result relative to a change of the historical click-through rate of the second search result during the first time period.

13. The system of claim 11, wherein the operations further comprise:
    identifying a keyword related to the first search result; and
    adding the keyword to the query when the query is submitted to a search engine during the second time period.

14. The system of claim 11, wherein the determined historical click-through rates are for a first geographic region.

15. The system of claim 14, wherein adjusting the ranking of the first search result further comprises determining that a region from which the query is received is the first geographic region.

16. The system of claim 11, wherein a click-fraction of the calculated click fractions is a ratio of the determined historical click-through rate of the first search result in the time period to the determined historical click-through rate of the second search result in the time period.

17. The system of claim 11, wherein the first time period and the second time period are corresponding periods based on a lunar calendar or a Gregorian calendar.

18. The system of claim 11, wherein the first time period and the second time period are each a same day of a week, same days of a week, same annual holidays, same weeks of a month, same weeks of a year, same biweekly periods of a year, same months of a year, or same seasons of a year.

19. The system of claim 11, wherein the minimum change threshold is a standard deviation of the calculated click-fractions.

20. The system of claim 11, wherein the obtained search results include the first search result.

21. A non-transitory machine-readable storage device having instructions stored thereon which, when executed by at least one data processing apparatus, cause the at least one data processing apparatus to perform operations comprising:

determining historical click-through rates over a plurality of time periods for a first search result responsive to a query and for a second search result responsive to the query wherein the first and second search results refer to different respective web pages;

calculating click-fractions for one or more of the plurality of time periods based on the determined historical click-through rates of the first and second search results;

determining that a particular click-fraction of the calculated click-fractions in a first time period of the plurality of time periods exceeds a minimum change threshold;

receiving the query from a user during a second time period that chronologically follows the plurality of time periods;

obtaining search results responsive to the query;

adjusting a ranking of the first search result in the obtained search results during the second time period; and providing the search results including the adjusted ranking of the first search result to the user.

22. The storage device of claim 21, wherein the adjustment of the ranking of the first search result is in proportion to a magnitude of a change of the historical click-through rate of the first search result relative to a change of the historical click-through rate of the second search result during the first time period.

23. The storage device of claim 21, wherein the operations further comprise:

identifying a keyword related to the first search result; and adding the keyword to the query when the query is submitted to a search engine during the second time period.

24. The storage device of claim 21, wherein the determined historical click-through rates are for a first geographic region.

25. The storage device of claim 24, wherein adjusting the ranking of the first search result further comprises determining that a region from which the query is received is the first geographic region.

26. The storage device of claim 21, wherein a click-fraction of the calculated click fractions is a ratio of the determined historical click-through rate of the first search result in the time period to the determined historical click-through rate of the second search result in the time period.

27. The storage device of claim 21, wherein the first time period and the second time period are corresponding periods based on a lunar calendar or a Gregorian calendar.

28. The storage device of claim 21, wherein the first time period and the second time period are each a same day of a week, same days of a week, same annual holidays, same weeks of a month, same weeks of a year, same biweekly periods of a year, same months of a year, or same seasons of a year.

29. The storage device of claim 21, wherein the minimum change threshold is a standard deviation of the calculated click-fractions.

30. The storage device of claim 21, wherein the obtained search results include the first search result.

\* \* \* \* \*